(No Model.)  2 Sheets—Sheet 1.
W. CLARK.
PHOTOGRAPHIC CAMERA.
No. 308,469. Patented Nov. 25, 1884.
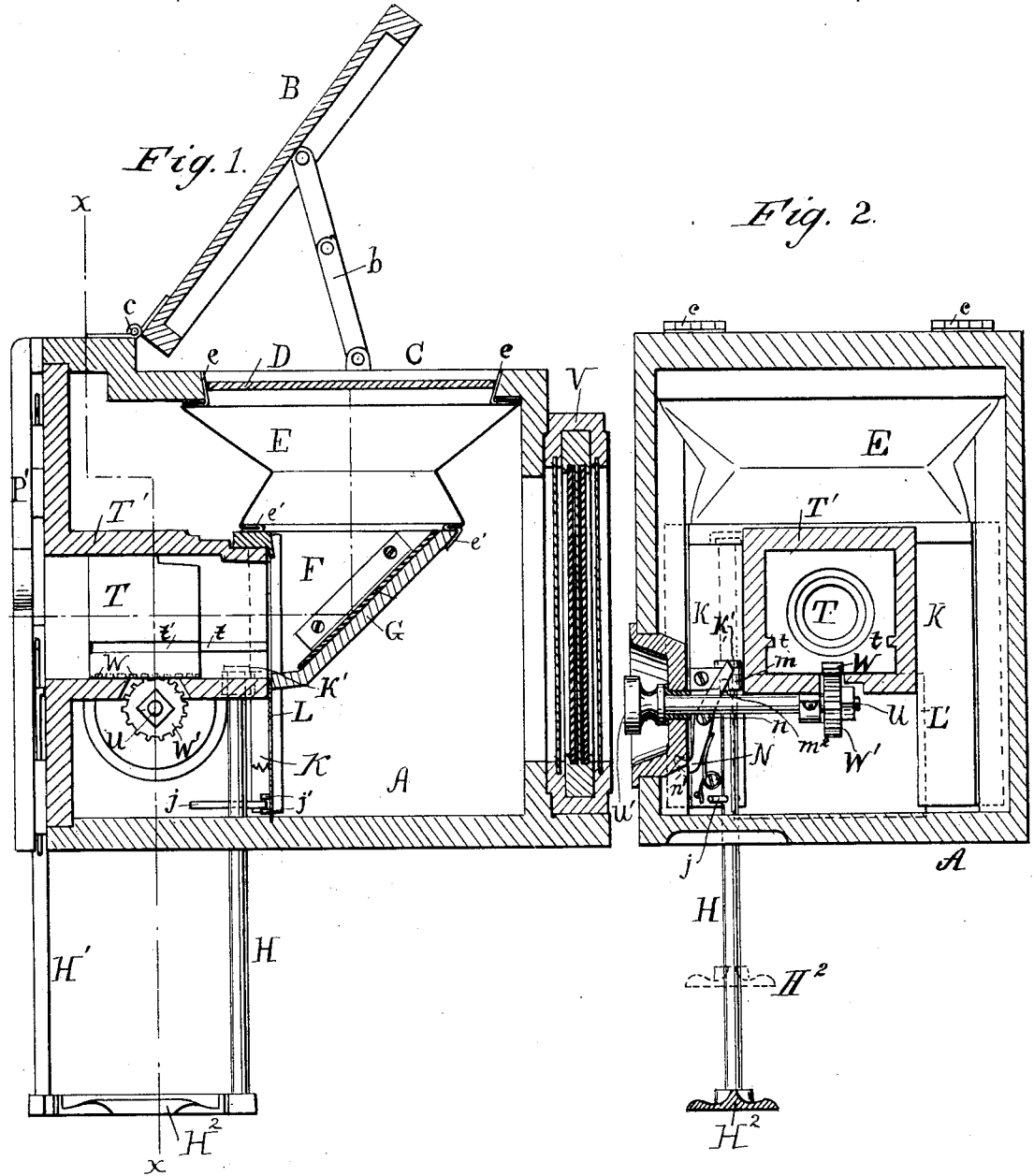
WITNESSES:
Donn Twitchell
C. Sedgwick
INVENTOR:
W. Clark
BY Munn & Co
ATTORNEYS.

(No Model.) 2 Sheets—Sheet 2.
W. CLARK.
PHOTOGRAPHIC CAMERA.
No. 308,469. Patented Nov. 25, 1884.
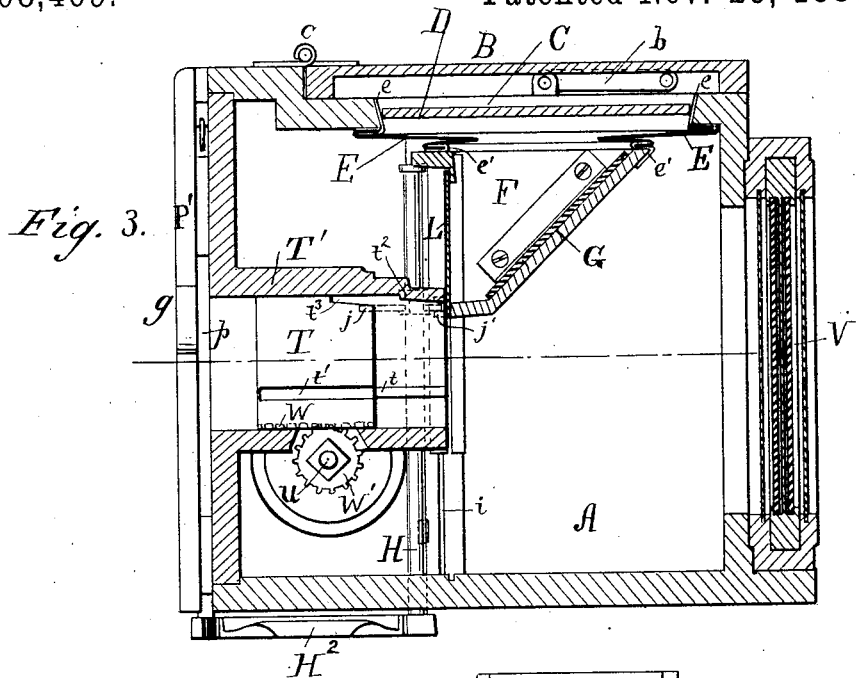
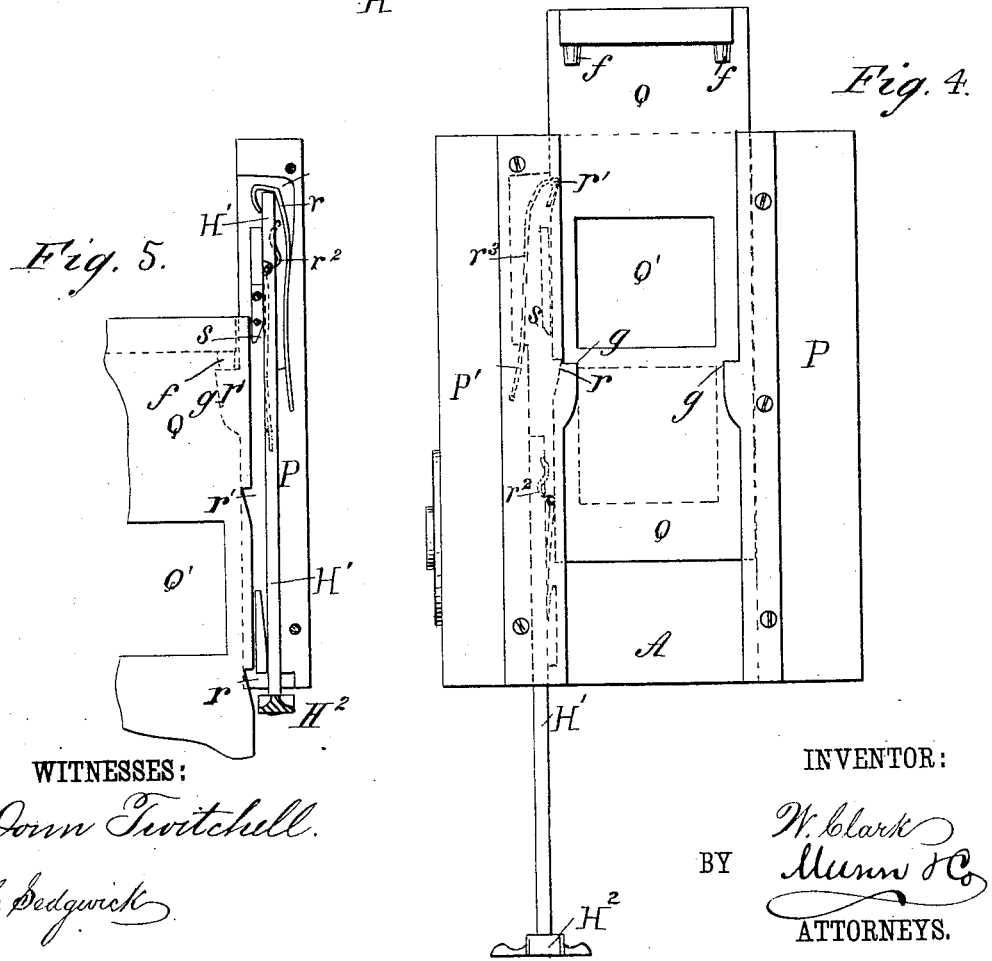
WITNESSES:
Donn Twitchell.
C. Sedgwick.
INVENTOR:
W. Clark
BY Munn & Co.
ATTORNEYS.

UNITED STATES PATENT OFFICE.

WALTER CLARK, OF NEW YORK, N. Y.

PHOTOGRAPHIC CAMERA.

SPECIFICATION forming part of Letters Patent No. 308,469, dated November 25, 1884.

Application filed August 8, 1883. Renewed August 14, 1884. (No model.)

*To all whom it may concern:*

Be it known that I, WALTER CLARK, of the city, county, and State of New York, have invented certain new and useful Improvements in Photographic Cameras, of which the following is a full, clear, and exact description.

In cameras for photographing purposes as the same have heretofore been constructed numerous movements are necessary, and much valuable time is lost to adjust the camera after focusing upon the ground glass and before exposing the sensitive plate. Thus it has been usual, after focusing upon said glass, to remove the same, with its holder, and to substitute in its place, back of the lens, the sensitive plate and its holder.

One of the objects of this invention is to dispense with these several movements or manipulations, and to effect an instantaneous exposure of the object as it is seen upon the ground glass, and, furthermore, to present the object upon the focusing-glass in an upright instead of in an inverted position.

A primary object of the invention is to construct a photographic camera in which the plate-holder containing the sensitive plate may remain in its place back of the lens while focusing on the ground glass or transparency, and so that said glass will not require to be removed or be disturbed to take the picture upon the sensitive plate.

These and other objects my invention secures, and by a single simple manipulation any moving objects passing over the glass are or may be instantly transferred and pictured.

The invention consists in a photographic camera in which are combined an adjustable lens, a device for holding and exposing the sensitive plate at the back of the lens, a focusing-glass in the top or side of the camera-box, and a reflector for throwing the image upon the focusing-glass, said reflector being adjustable into or out of line with the lens for the purpose of throwing the image upon the focusing-glass and of afterward exposing the sensitive plate.

The invention also comprises a mirror or reflector with attached bellows and a ground glass, combined and arranged to divide the interior of the camera-box into separate compartments, and so that the image is transferred to the ground glass above without affecting the sensitive plate in the plate-holder having its slide drawn.

The invention also consists, in connection with the "movement" by which the picture is taken, in a diaphragm arranged to intervene between the lens and the mirror in the earlier part of the operation of the movement or mechanism for taking the picture, and to cover or inclose the mirror when out of line with the lens, so as to prevent light from above from entering the compartment in which the sensitive plate is exposed; also, in a spring-catch for holding down the bellows mirror-case until this action is performed.

The invention likewise consists in a combination, in the hand device for operating the camera, of duplicate sliding posts, by one of which the interior movements are accomplished, and by the other of which a guillotine drop in front of the lens is simultaneously operated; also, in certain catches and springs for controlling the movement of the drop.

The invention also comprises various other details of construction, substantially as hereinafter described.

Reference is to be had to the accompanying drawings, forming part of this specification, in which similar letters of reference indicate corresponding parts in all the figures.

Figure 1 is a longitudinal vertical section of a photographic camera embodying my invention, and showing the instrument as adjusted for focusing the object on the ground glass. Fig. 2 is a vertical transverse section of the same on the irregular line *x x* in Fig. 1, omitting the lid of the box. Fig. 3 is a longitudinal vertical section showing the camera adjusted for taking the picture. Fig. 4 is an elevation of the front end of the camera-box, showing the guillotine drop having a light-inlet aperture in it in position before taking the picture. Fig. 5 is an elevation of the same in part, looking toward the inner side or face of an upright in which the guillotine drop moves, and showing said drop after it has fallen and the picture been taken.

A is the camera-box, provided with a lid, B, hinged as at *c*, and supported, when open, by a jointed side brace, *b*.

In the top of the box A is an aperture, C, having beveling sides for the reception of the ground-glass plate D, upon which the picture is focused. A bellows, E, is secured at its upper end to the box A within or on the under side of the marginal portion of the aperture C by bent zinc lapping strips $e$, that may also form the seat for the ground glass. The lower end of the bellows is similarly secured by bent zinc strips $e'$ to the upper end of a mirror box or case, F. This mode of attaching the bellows also serves to exclude light from entering from above to the front compartment of the box. The case F is constructed to incline upwardly on its back and away from the lens end of the camera, for the support thereon at a proper angle relatively to the ground glass D of a reflector or mirror, G. The top of the case F and the face of it opposite the reflector are both left open. Vertical wings K are attached to the sides of the case F in front and arranged to extend below it. These wings are fitted to work up and down within ways $i$ in the sides of the box A as the case rises or falls with the bellows, and are vertically grooved to admit of a diaphragm, L, which extends across or between them, being independently moved up and down and in front of or out of the way of the open face of the case F, said diaphragm working in grooves in the wings K.

H H' are duplicate upright rods or posts arranged to extend below the box A, and connected by a cross-tie, $H^2$, which forms a handle for manipulating or sliding the rods or posts H H' up and down. One of these rods, H, which passes through the bottom of the camera-box, is fitted with a cross-pin, $j$, that at its one end enters between two studs, $j'$, on the diaphragm. This provides for the operation of said diaphragm by the rod H.

N is a spring-catch arranged to work upon a pivot, $n$, intermediately of its length, on one of the wings K of the mirror-case F, and forced by its spring to engage with a recess, $n'$, in the side of the camera-box, to hold the bellows mirror-case F down to its lowermost position till it is necessary in the operation of the apparatus to raise the same, which is not until the diaphragm L has been raised to intervene between the lens-case T of the instrument and the mirror G. The earlier portion of the upward manipulation of the hand device H H' $H^2$ causes the rod H, by its pin $j$, to first adjust the diaphragm L into this intercepting position between the lens and the mirror, and afterward, as the pin $j$ is further raised by the continued upward movement of the rod H, said pin in riding over the back of the upper arm of the spring-catch N releases said catch from its hold on the camera-box, after which said pin $j$ enters a slot, $m^2$, in a projection, $m$, on the case F, through which the rod H passes and is guided, and, as the rod H is further moved upward, raises the mirror-case, collapsing its bellows till said mirror-case or first and interior compartment of the camera-box is moved from its intercepting position between the lens-case T and sensitive-plate holder V, the picture then having been previously focused upon the ground glass D.

Figs. 1 and 2 represent the mirror-case in focusing position, and Fig. 3 after it is raised out of the way, and where it remains till, in the subsequent operation of the apparatus, the rod H is lowered again, when a cap, K', on said rod, striking the projection $m$ on the mirror-case F, draws down said mirror-case with it to readjust the same and its spring-catch N and diaphragm L into their normal position. (Shown in Figs. 1 and 2.)

Q is the guillotine drop, arranged to move up and down between the two upright strips P P' upon the front or lens end of the camera-box A. The rod H' of the hand device H H' $H^2$ passes up through a groove in the one P' of these strips. The guillotine drop Q has a light inlet or aperture, Q', in it, and notches $r$ $r'$ (the use of which will be hereinafter described) in the edge of it, which works within the strip P'. Arranged under cover of this strip P'—one above the other—are two springs, $r^2$ $r^3$, that engage with the notches $r$ $r'$ in the drop Q. The one $r^2$ of these springs is attached to the rod H', and is shaped as shown. The other, $r^3$, of said springs is permanently secured within the strip P'.

In the operation of the apparatus the lid B of the box is first raised and the hand device H H' $H^2$ drawn fully down, as shown in Figs. 1 and 2. This brings the interior compartment or mirror-case, F, into focusing position with the lens of the lens-case T, which is fitted to slide by tongues and grooves $t$ $t'$ within a frame, T', and is adjusted to effect the focusing by a pinion, W', arranged to gear with a rack, W, on the under side of the lens-case, said pinion being fast on a shaft, U, arranged to pass through the side of the camera-box. The mirror-case F having been lowered into focusing position, as described, the drop Q is first raised by hand to uncover the lens or bring its aperture Q' in line therewith, the spring $r^2$ then bearing on the edge of the drop Q to induce a slight friction, so as to keep the drop from falling. The picture is then focused on the ground glass by suitably turning the shaft U through a finger-wheel, U', on the outer end of said shaft. Prior to this, or so soon as the mirror-case F has been lowered into focusing position, the slide of the plate-holder V may be withdrawn to make the instrument ready for action. After the picture has been focused on the ground glass D, the hand device H H' $H^2$ is rapidly pushed up. This not only first raises the diaphragm L into its intercepting position, but in due order the bellows mirror-case F out of the way, and by the engagement of the spring $r^2$ with the notch $r$ lifts the drop Q till the spring $r^3$ engages with the notch $r'$ to hold the drop Q in its elevated closed position, after which, or during the concluding portion of the upstroke of the hand device H H' H², the spring r², entering back of a releasing-guide, s, is relieved from hold and pressure on the drop Q, leaving it suspended on the spring r³, and immediately afterward the rod H', as it finishes its rising movement, acts upon the spring r³ to release it from its hold on the drop Q, which then falls till arrested by cushions f f striking projections g g on the strips P P', and as said drop falls, or, rather, while its aperture Q' passes the lens or opening in the lens-case, the picture is taken on the sensitive plate, the holder V containing which may then be removed. After this the apparatus may be adjusted to repeat the operation as before for the production of a succeeding picture.

Referring to the previous description, it will be noticed that so soon as the picture has been focused the drop Q is raised in the early upward motion of the hand device H H' H² to close the opening to the lens to prevent light from entering therethrough till after the further raising and subsequent fall of the drop when the picture is taken. The springs or spring-catches r² r³ govern this action. It should also be noted that the diaphragm L, in being raised to close the mirror-case F before the spring-catch N is released to admit of the raising of said case, and the diaphragm being kept closed till after the picture is taken, light is excluded from entering by the ground glass D and through the mirror-case into the outer compartment of the box in which the sensitive plate is exposed. The single operation of raising the hand device H H' H² to take the picture only requiring a simple rapid movement, anything seen and focused upon the ground glass is instantly seized, no changing of the glass for the sensitive plate being required, and the picture being focused in an upright instead of in an inverted position. The exposure of the sensitive plate also only being momentary, objects in motion may readily be photographed, although, if a longer exposure for photographing fixed objects is necessary, this may be done by intercepting by hand the drop Q in its fall when the aperture Q' is opposite the lens.

The plate-holder V may be of the usual or any suitable construction.

Different devices may be used for adjusting the mirror or mirror-case into or out of line with the lens, and the mirror and focused glass may be arranged to focus on the side instead of on the top of the camera-box. The independently-moving diaphragm, too, in front of the mirror-case, might be dispensed with, as also the case itself, and a simple mirror or reflector hinged below and connected above with the lid of the camera-box be used, and so that, when the lid is opened to expose the focusing-glass, the mirror will be raised into line with the lens, and be lowered out of the way of it for exposure of the sensitive plate by or when closing said lid. In some cases, too, the guillotine drop may be done away with and a simple cloth or loose covering may be used; or, where a drop is employed, it may be a plain slide without a light inlet or aperture through it.

Having thus described my invention, what I claim as new, and desire to secure by Letters Patent, is—

1. In photographic cameras in which the following elements are combined—namely, an adjustable lens, a device for holding and exposing the sensitive plate at the back of the lens, a focusing-glass in the top or side of the camera-box, and a reflector for throwing the image upon the focusing-glass—a photographic camera-box provided with two compartments, the one of which carrying the reflector is constructed with an open side next to the lens, and made capable of adjustment in or out of connection with the lens, while the other compartment serves for exposure of the sensitive plate, substantially as specified.

2. In a photographic camera having an interior inclined mirror and upper glass focusing-compartment capable of adjustment into and out of connection with the lens or lens-case of the instrument, the combination, with said compartment, of a movable diaphragm arranged to move between the lens and the mirror, essentially as and for the purposes herein described.

3. In a photographic camera, the combination, with the lens, of the bellows E, mirror-case F, reflector G, and diaphragm L, essentially as herein set forth.

4. The combination of the sliding rod H with its pin or projection j, the mirror-case F, and the spring-catch N, substantially as specified.

5. The combination of the sliding rod H' with its attached spring r², the stationary spring r³, and the drop Q, essentially as and for the purposes herein set forth.

6. The combination, with the camera-box A, bellows E, and mirror-case F, of the bent lapping strips e e', for attachment of the bellows to said box and case, substantially as herein shown and described.

7. In a photographic camera-box, the combination of the connected sliding rods H H' with the focusing mirror-case F, its independently-moving diaphragm L, the drop Q, and catches or attachments connected with said rods for operating the mirror-case, its diaphragm, and the drop in relation with each other, essentially as described.

8. The combination of the springs r² r³ with the releasing-guide s, the rod H', and the drop Q, substantially as and for the purpose specified.

9. In a photographic camera-box, the combination, with an interior focusing or mirror case, of the adjustable lens or lens-case T and frame T', substantially as herein shown and described.

10. A photographic camera in which the following elements are combined: a camera-box fitted with an adjustable lens, and composed of an outer compartment for exposure of the sensitive plate, and an inner compartment or mirror-case adjustable into and out of line with the lens and inclosed on top by a fixed focusing-glass, and an independent moving diaphragm in front of said mirror-case, all arranged for operation in relation with each other substantially as specified.

WALTER CLARK.

Witnesses:
 EDGAR TATE,
 ROBERT TAYLOR ADAMS.